(12) United States Patent
Morper et al.

(10) Patent No.: US 8,905,194 B2
(45) Date of Patent: Dec. 9, 2014

(54) LUBRICANT DISPENSER

(75) Inventors: Rainer Morper, Ramsthal (DE);
Eduard Rohner, Hammelburg (DE)

(73) Assignee: Perma-Tec GmbH & Co. KG, Euerdorf (DE)

( * ) Notice: Subject to any disclaimer, the term of this patent is extended or adjusted under 35 U.S.C. 154(b) by 23 days.

(21) Appl. No.: 13/201,187

(22) PCT Filed: Dec. 24, 2009

(86) PCT No.: PCT/EP2009/009278
§ 371 (c)(1),
(2), (4) Date: Sep. 1, 2011

(87) PCT Pub. No.: WO2010/099812
PCT Pub. Date: Sep. 10, 2010

(65) Prior Publication Data
US 2011/0315485 A1    Dec. 29, 2011

(30) Foreign Application Priority Data

Mar. 5, 2009  (DE) .......................... 10 2009 011 374
May 26, 2009  (DE) .......................... 10 2009 022 707

(51) Int. Cl.
| | | |
|---|---|---|
| F16N 13/16 | (2006.01) | |
| B67D 7/60 | (2010.01) | |
| F16N 11/10 | (2006.01) | |
| F16N 29/02 | (2006.01) | |

(52) U.S. Cl.
CPC ................ *F16N 11/10* (2013.01); *F16N 29/02* (2013.01); *F16N 2230/02* (2013.01)
USPC ............................................ 184/39; 222/389

(58) Field of Classification Search
USPC ................. 184/6.28, 39, 76; 73/54.07, 54.08; 222/389
See application file for complete search history.

(56) References Cited

U.S. PATENT DOCUMENTS

| | | | | |
|---|---|---|---|---|
| 4,023,648 | A | * | 5/1977 | Orlitzky et al. ................. 184/39 |
| 4,671,386 | A | * | 6/1987 | Orlitzky .......................... 184/39 |
| 4,744,442 | A | * | 5/1988 | Bras et al. ....................... 184/39 |
| 5,012,897 | A | * | 5/1991 | Jorissen .......................... 184/39 |
| 5,312,389 | A | * | 5/1994 | Theeuwes et al. ......... 604/892.1 |

(Continued)

FOREIGN PATENT DOCUMENTS

| | | |
|---|---|---|
| DE | 102005035452 A | 2/2007 |
| DE | 102005048288 A | 4/2007 |

OTHER PUBLICATIONS

DE102005048288 English Translation.pdf.*

*Primary Examiner* — William E Dondero
*Assistant Examiner* — Minh Truong
(74) *Attorney, Agent, or Firm* — Andrew Wilford

(57) ABSTRACT

A lubricant dispenser having a cartridge, a wall in the cartridge defining therein a lower chamber and an upper chamber, and a piston subdividing the lower chamber into a lower lubricant compartment and an upper gas compartment. The cartridge has an outlet opening into the lower lubricant compartment. A body of fluent lubricant fills the lower lubricant compartment. A housing in the upper chamber holds a gas generator connected through the wall to the gas compartment and electrically energizeable to generate gas and pressurize the gas compartment. A battery is secured to the housing. An electronic controller removably mounted in the upper chamber has electrical contacts connectable to the battery and to the gas generator. It is powerable by the battery for operating the gas generator and thereby pressurizing the gas compartment, moving the piston, and forcing the lubricant out of the outlet.

12 Claims, 4 Drawing Sheets

(56) References Cited

U.S. PATENT DOCUMENTS

| | | | |
|---|---|---|---|
| 5,386,883 A * | 2/1995 | Graf | 184/39 |
| 5,404,966 A * | 4/1995 | Yang | 184/39 |
| 5,460,242 A * | 10/1995 | Graf | 184/29 |
| 5,460,243 A * | 10/1995 | Patterson | 184/29 |
| 5,598,901 A * | 2/1997 | Graf | 184/39 |
| 5,788,012 A * | 8/1998 | Yang | 184/6.4 |
| 5,968,325 A * | 10/1999 | Oloman et al. | 204/230.5 |
| 6,354,816 B1 * | 3/2002 | Yang | 417/411 |
| 6,498,956 B1 * | 12/2002 | Yang | 700/14 |
| 6,786,365 B2 * | 9/2004 | Kim | 222/389 |
| 2006/0180395 A1 * | 8/2006 | Graf | 184/26 |
| 2008/0060879 A1 | 3/2008 | Orlitzky | |
| 2009/0038888 A1 * | 2/2009 | Eisenbacher | 184/39 |

\* cited by examiner

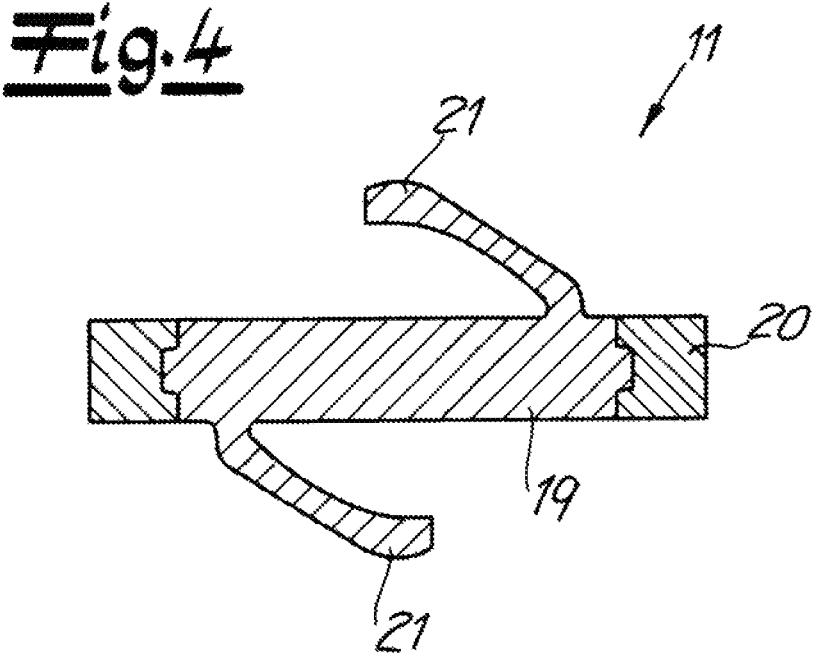
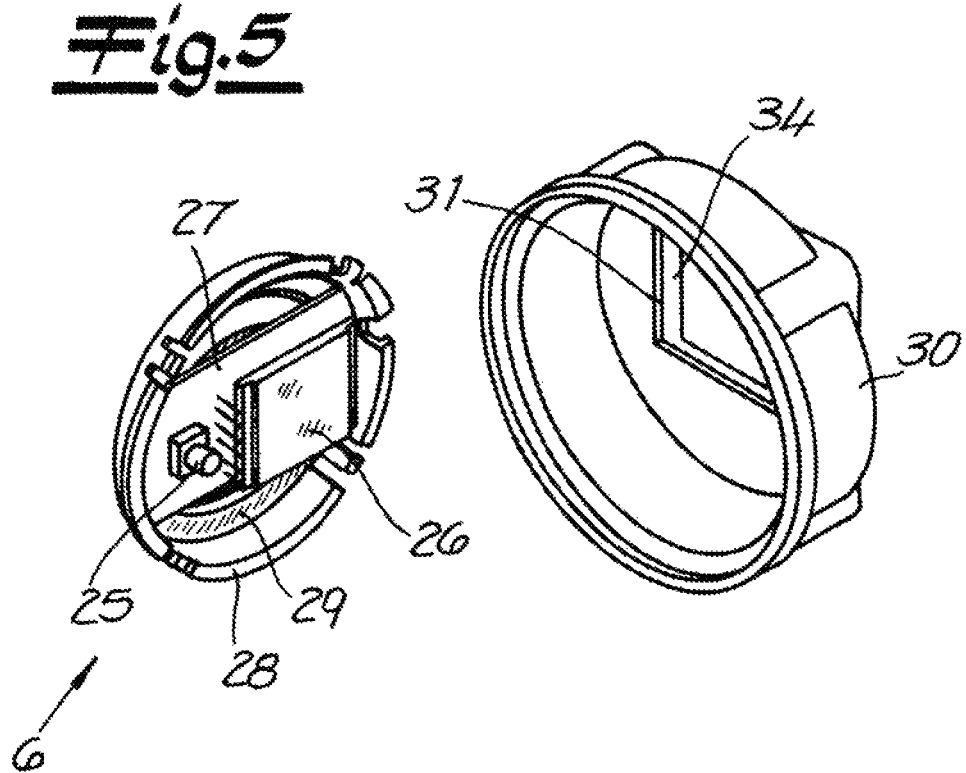

LUBRICANT DISPENSER

CROSS REFERENCE TO RELATED APPLICATIONS

This application is the US-national stage of PCT application PCT/EP2009/009278 filed 24 Dec. 2009, published 10 Sep. 2010 as WO2010/099812, and claiming the priority of German patent application 102009011374.6 itself filed 5 Mar. 2009 and German patent application 102009022707.5 itself filed 26 May 2009, whose entire disclosures are herewith incorporated by reference.

FIELD OF THE INVENTION

The invention relates to a lubricant dispenser having
a lubricant cartridge that has a lubricant supply chamber having a lubricant outlet, a piston, and a gas generator for electrochemical generation of a gas,
an electronic controller for controlling electrochemical gas generation, and
a battery for supplying power to at least the electronic controller.

BACKGROUND OF THE INVENTION

A lubricant dispenser having the characteristics described is known from DE 10 2005 035 4521. The gas generator, the electronic controller, and a battery for the power supply are integrated into the lubricant cartridge and contained in a sealed housing. The lubricant cartridge is a disposable article and is disposed of, as a whole, including the electronic components, once the lubricant supply chamber has been emptied. Such a practice is unsatisfactory both from environmental aspects and from the point of view of costs. It is furthermore disadvantageous that the battery can be partly discharged after extended storage of the lubricant dispenser, even before the lubricant dispenser is put into operation, because the electronic control device is already supplied with current by the battery even in the passive state. Sometimes, it is not possible to ensure that the lubricant dispenser will still function properly over an extended period of time for dispensing as the result of partial discharge caused by storage.

The electronic control of lubricant dispensers that have an electrochemical gas drive is becoming increasingly more complex. From EP 0 806 603 [U.S. Pat. No. 5,578,802], an electronic controller for lubricant dispensers having an electrochemical drive is known having a microcomputer, an LCD display, and a selection switch for setting the dispensing period. For environmental and cost reasons, it is practical for such a controller to be reused. In this connection, care must be taken to ensure that handling of a lubricant dispenser having an interchangeable electronic control is easy, and that when a new lubricant cartridge is used, the power supply is guaranteed over a long dispensing time, which can amount to many months.

OBJECT OF THE INVENTION

Against this background, the object of the invention is to provide a lubricant dispenser having the characteristics described above and whose electronic controller can be reused. In this connection, handling of the lubricant dispenser should be as easy as possible, and that when a new lubricant cartridge is used, not only the gas-generating element but also the battery are replaced.

SUMMARY OF THE INVENTION

This object is achieved according to the invention, in that the electronic controller is releasably connected with the lubricant cartridge as a separate and reusable unit and has electrical contacts that stand in connection with electrical connectors of the gas generator, and that the battery is inaccessibly held on a housing of the gas generator. According to the invention, the electronic controller does not have its own power source. A power circuit for the gas generator is closed only when the electronic controller is mounted on the lubricant cartridge, thereby making the electronic controller ready for operation. The battery is also integrated into the lubricant cartridge just like the gas generator. When a new lubricant cartridge is installed, a new battery for the power supply, particularly also for supplying power to the electronic controller, is also installed. Because the power circuits supplied by the battery are only closed when the electronic controller is mounted on the lubricant cartridge, undesirable premature discharging of the battery is not possible, even after extended storage of the lubricant cartridge. A high-quality battery has to be used for operation of a lubricant dispenser that is frequently used outdoors at extreme temperatures, and works over extended periods of several months. Experience has shown that such high-quality batteries are sometimes removed from lubricant dispensers and stolen. Because the battery is inaccessibly integrated into the lubricant cartridge, according to the invention, and cannot be removed without destroying the cartridge, the risk of theft is clearly reduced. Because of the physical separation of the battery and the electronic controller, the risk that the electronic controller will be removed, contrary to its intended use, and used elsewhere, is also reduced.

Without fundamental restrictions, various systems can be used as an electrochemical gas generator within the scope of the teaching according to the invention. In particular, electrochemical gas generators that need a power source for gas generation can be used. It is understood that the battery or any additional battery that is also held on the housing of the gas generator so as to be inaccessible from the outside supplies energy for the electrochemical reaction. Furthermore, systems whose gas generation begins spontaneously when a power circuit is closed can be used as a gas generator. These include, in particular, zinc/air cells that have the outside dimensions of a commercially available button battery, and have an anode made from Zn—Pt, a cathode made from Ni or C, and an electrolyte solution (KOH, $H_2SO_4$).

According to a preferred embodiment of the invention, the housing of the gas generator has a compartment for a gas-generating cell, the compartment being sealed gastight by a cover and connected with the gas space on the back of the piston within the lubricant cartridge by a gas outlet opening. The gas-generating cell preferably is a zinc/air cell or a stack of several zinc/air cells one atop the other and that emit hydrogen when electrically energized and do not require any outside energy. The cover of the compartment and a face of the compartment that lies opposite the cover form electrical contacts.

The housing of the gas generator can be an injection-molded part that has a base made of an electrically nonconductive plastic and a part made of an electrically conductive material, where the electrically conductive part forms a contact surface for the battery and for the gas-generating cell a contact element that is electrically connected with it. In this connection, the gas-generating cell and the battery have a common ground contact. The battery is mounted in place by a clip on the outside of the housing. Furthermore, electrically conductive spring contacts are inserted in the power supply of the gas generator and bear against the battery or are indirectly electrically connected with it and interact with electrical contacts of the electronic controller.

The cover of the compartment for the gas cell is preferably configured as an injection-molded part that has an electrically conductive core and a ring of a nonconductive plastic surrounding the core. The ring is welded to the housing of the gas generator and forms a gastight closure of the compartment in this manner. Electrically conductive spring contacts are provided on both sides of the electrically conductive core of the cover and are also produced from a conductive plastic and can formed unitarily in one piece with the core of the cover. The cover for the compartment can cost-advantageously be produced as a two-component injection-molded part, in the manner described. After the lubricant supply chamber has been emptied, the housing with the gas generator and the battery can be broken out of the lubricant cartridge, and the elements can be disposed of properly in the appropriate manner. For this reason, it is practical if the gas outlet channel of the gas generator is connected with a related opening in the container bottom wall by a releasable connection. Furthermore, the lubricant cartridge can have a pressure relief device in the form of a valve or an intended breaking point.

The electronic controller has a board is equipped with electronic components, a button for setting the dispensing time, and an LCD display. The back of the board carries electrical contacts that engage electrical connectors of the gas generator after the electronic controller has been installed. According to a preferred embodiment of the invention, the electrical contacts are concentrical circular conductor tracks each engaging a respective electrical contact of the gas generator. It is practical if the board is mounted in a housing cover that has a window for the LCD display and an opening for activating the button, and can be attached to the lubricant cartridge by a screw or bayonet connection. To protect the LCD display and the electronic components from moisture, a seal is provided between the housing cover and the lubricant cartridge, and the window and the opening for the button are sealed off by a film that is laid into the work piece mold when the housing cover, which consists of plastic, is produced, and can be molded in place during production of the plastic cover. It is understood that the protective film can also be connected with the housing cover by other methods, for example by bonding or gluing.

BRIEF DESCRIPTION OF THE DRAWING

The invention will be explained below with reference to an illustrated embodiment. In the drawing:

FIG. 4 is a detail view of a cover that closes a compartment holding a gas-generating cell within the gas generator, FIG. 5 shows the electronic controller of the lubricant dispenser in an exploded view.

SPECIFIC DESCRIPTION OF THE INVENTION

Figure 1:
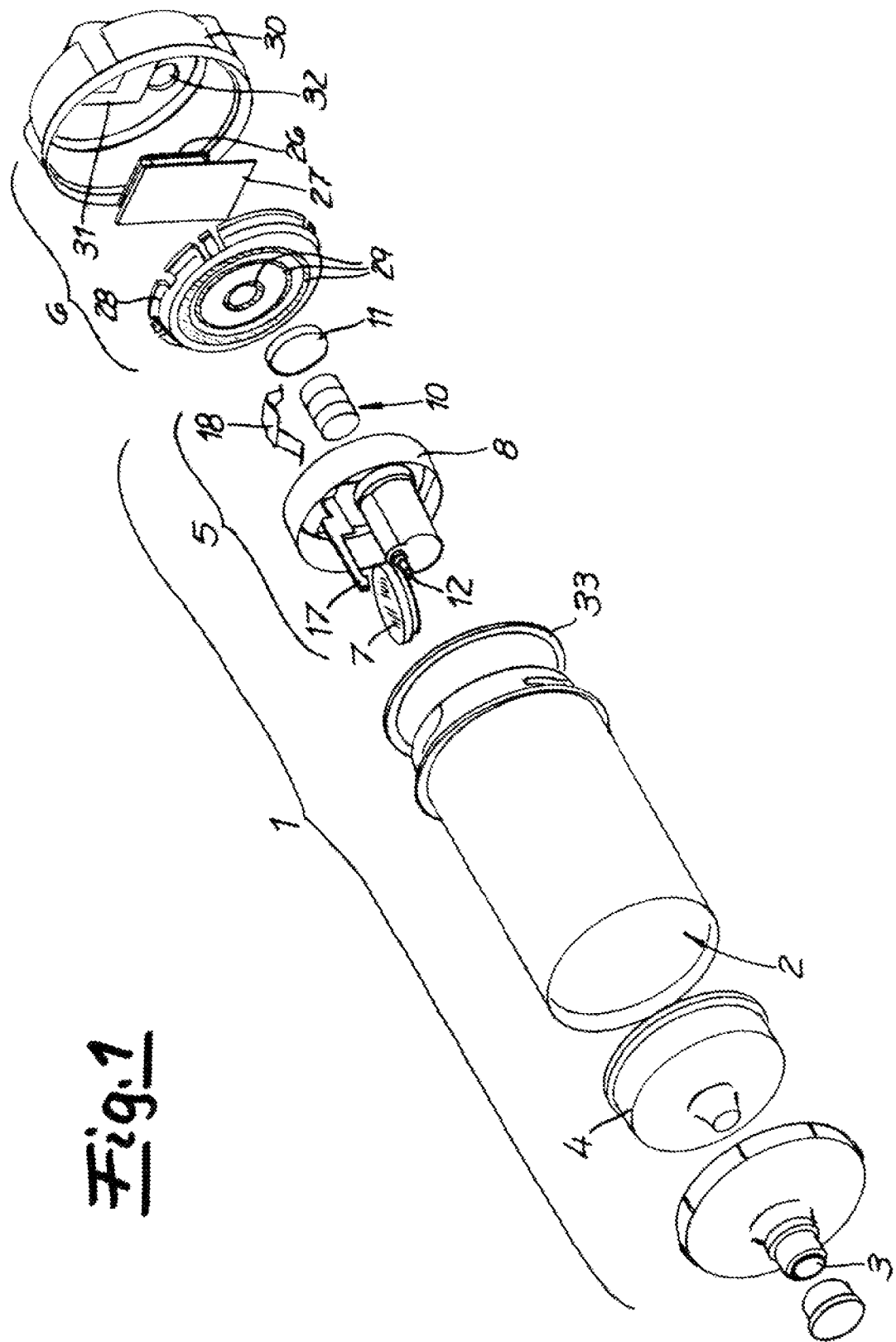
FIG. 1 is an exploded view of a lubricant dispenser according to the invention.

The basic structure of the lubricant dispenser shown in the figures includes a lubricant cartridge 1 having a lubricant supply chamber 2 having a lubricant outlet 3, a piston 4, a gas generator 5 for electrochemical generation of a gas, an electronic controller 6 for controlling the electrochemical gas generation, and a battery 7 for supplying power to the electronic controller 6. The electronic controller 6 is releasably connected with the lubricant cartridge 3 as a separate and reusable unit and has electrical contacts that engage electrical connectors of the gas generator 7. The battery 7 is inaccessibly held on a housing 8 of the gas generator 5. The electronic controller 6 does not have its own power source, so that a circuit connected to the gas generator 5 is only closed by mounting the electronic controller 6 on the lubricant cartridge 1, thereby making the electronic controller 6 ready for operation.

Figure 2:
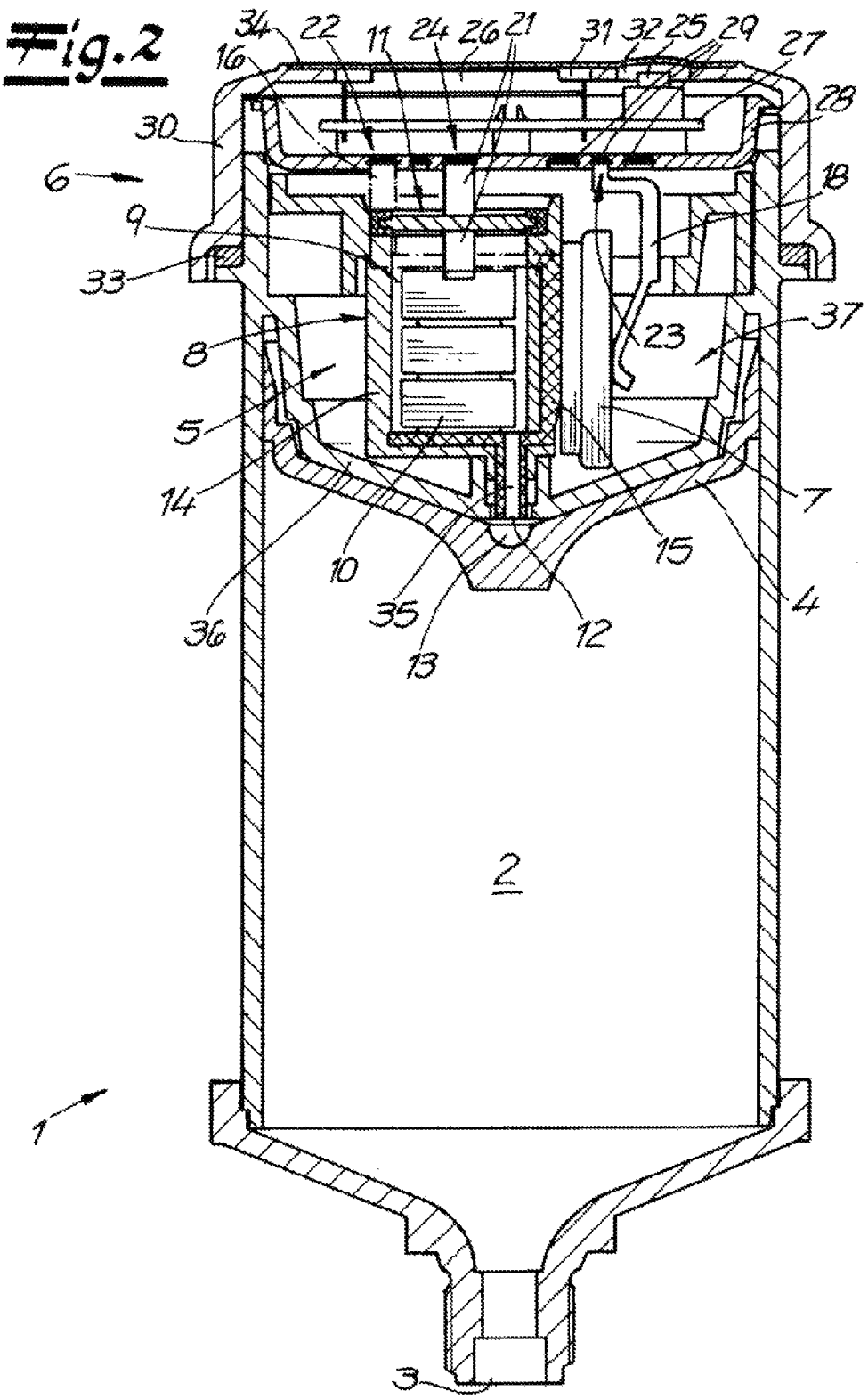
FIG. 2 is a longitudinal section through the lubricant dispenser.

It can be seen in the sectional view of FIG. 2 that the housing 8 of the gas generator 5 forms a compartment 9 for a gas-generating cell 10, the compartment 9 being closed off gastight by a cover 11 and being connected with a gas space 13 in the lubricant cartridge 1 behind the piston 4 by a gas outlet opening 12. In the illustrated embodiment, the gas-generating cell 10 consists of a stack of button-shaped zinc/air cells that produce hydrogen when electrically energized. The cover 11 of the compartment 9 and an end face of the compartment 9 confronting the cover 11 form electrical contacts. The housing 8 of the gas generator 5 is a plastic injection-molded part that has a base 14 made of an electrically nonconductive plastic and a part 15 made of an electrically conductive material. The electrically conductive part 15 of the plastic injection-molded part is shown with cross-hatching in FIGS. 2 and 3 and forms a contact surface for the battery 7 and a contact element for the gas-generating cell 10, is electrically connected with it, and extends all the way to the top of the housing 8 where an electrically conductive spring contact 16 is carried. On its outside, the housing 8 has a clip 17 for fixing the battery 7 in place. Another electrically conductive spring contact 18 is mounted on the housing 8 of the gas generator 5 and bears on the battery 7 to form an electrical connector for making contact with a contact of the electronic controller 6 at the top of the housing 8.

The cover 11 of the compartment 9 for the gas-generating cell 10 is also configured as a plastic injection-molded part that has an electrically conductive core 19 and a peripheral ring 20 of a nonconductive plastic that surrounds the core 19. The ring 20 is welded to the housing 8 of the gas generator 5 so that the compartment 9 is sealed off gastight at the top of the housing 8. This cover 11 that closes the compartment 9 is shown on a larger scale in FIG. 4. It can be seen in FIG. 4 that electrically conductive spring contacts 21 made of the conductive plastic are formed on the core 19 of the cover 11. For strength reasons it is practical if the spring contacts 21 are coiled as spirals.

Figure 3:
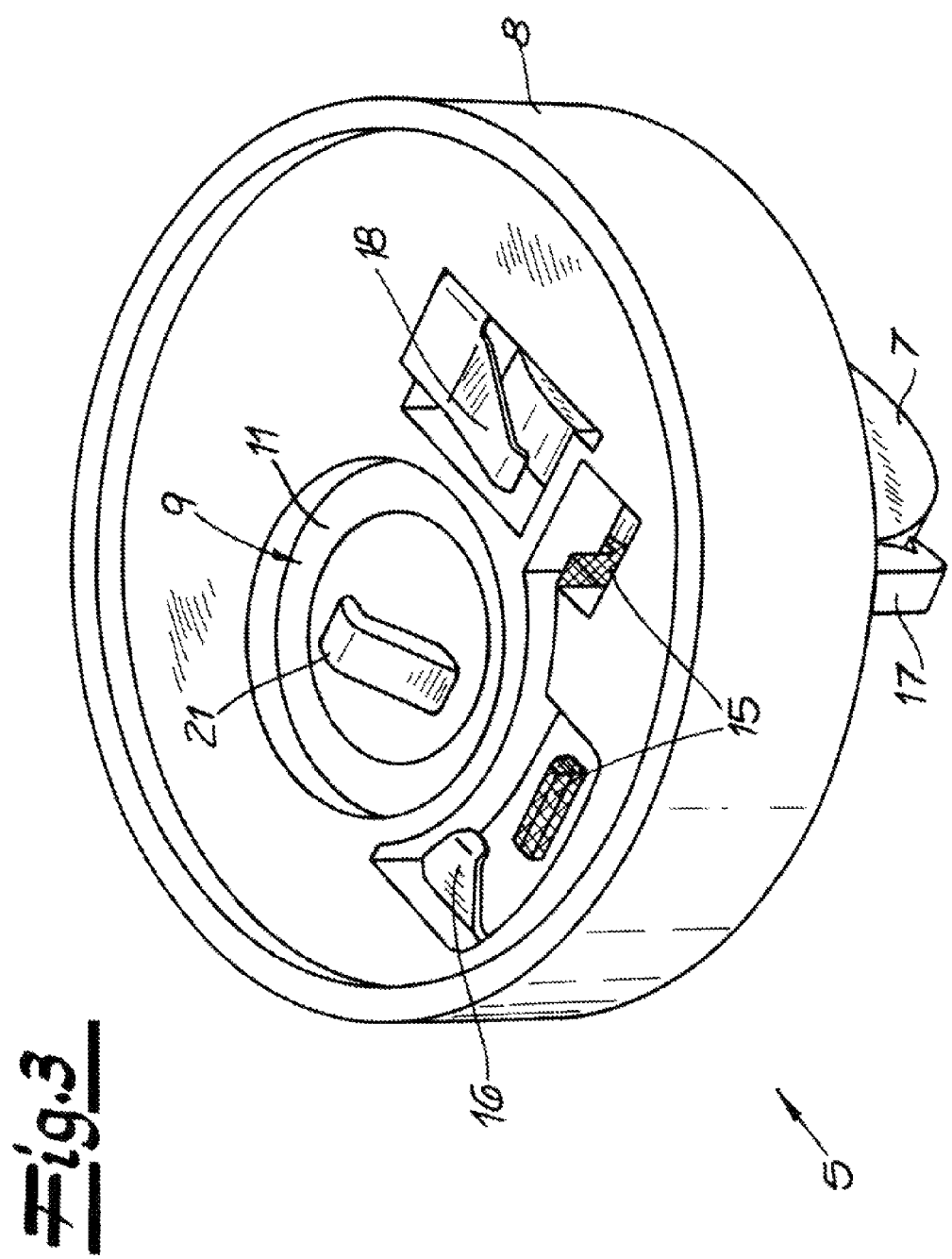
FIG. 3 is a perspective view of the gas generator of the lubricant dispenser.

At the top of the housing 8 shown in FIG. 3, one can see the three electrically conductive spring contacts 16, 18, 21 that form respective electrical connectors 22, 23, 24 of the gas generator. The electrical connectors 22 and 23 are part of a circuit for electrochemical gas generation. The electrical connectors 22 and 23 supply power to the electronic controller 6, while the electrical connector 22 forms a common ground contact for these circuits.

The electronic controller 6 has a circuit board 27 fitted with electronic components, a button 25 for setting a dispensing time, and an LCD display 26, the board being secured into a board cover 28. The board cover 28 has concentric circular conductor tracks 29 on its underside each associated with a respective one of the electrical connectors 22, 23, 24 of the gas generator 5. The board cover 28 with the board 27 attached to it and the electronic components described is mounted in a housing cover 30 having a window 31 for the LCD display 26 and an opening 32 for activating the button 25, and can be attached to the lubricant cartridge 1 by a screw or bayonet connection. FIGS. 1 and 2 show that a seal 33 is provided between the housing cover 30 and the lubricant cartridge 1, and that the window 31 and the opening 32 for the button 25 are sealed off by a film 34 to protect the electronic components from moisture and/or splashed water.

The electronic controller 6 is equipped with a microchip that controls the power flow of the circuit assigned to the gas-generating cell 10. At predetermined intervals, power in the circuit including the gas-generating cell 10 is turned on and off, so that gas generation can be changed by pulse width control, i.e. a change in the switching intervals. In addition or alternatively, the current intensity can also be controlled by a variable resistor. A dispensing mode can be selected by the button 25. The microchip calculates the dispensing time in accordance with the selected mode and makes available control signals that correspond to the calculated dispensing time. The selected mode or the calculated dispensing time is displayed on the LCD display 26.

It can particularly be seen in FIG. 2 that the gas generator 5 forms a separate module that is inserted into a cavity 37 of the lubricant cartridge 1 that is open at one end. The gas generator 5 is connected with a container bottom wall 36 inside the lubricant cartridge 1 only by a gas outlet channel 35. The bottom wall separates the cavity 37 from the gas space 13 on the back of the piston 4. The gas outlet passage 35 is configured as a tubular projection that has a small diameter and is preferably configured to have a thin wall. It engages into an opening of the container bottom wall 36 and is preferably connected with the container bottom wall 36 by friction welding. The gas outlet channel 35 and the connection between the gas outlet channel 35 and the related opening in the container bottom wall 36 are configured in such a manner that the gas generator 5 can easily be broken out of the lubricant cartridge 1, so that after the lubricant cartridge 1 is emptied, the gas generator can be disposed of separately.

The invention claimed is:

1. A lubricant dispenser comprising
a cartridge;
a wall in the cartridge defining therein a lower chamber and a cavity defining an upper chamber;
a piston subdividing the lower chamber into a lower lubricant compartment and an upper gas compartment, the cartridge having an outlet opening into the lower lubricant compartment;
a body of fluent lubricant in the lower lubricant compartment, whereby movement of the piston toward the outlet forces the lubricant from the compartment through the outlet;
a housing fixed in the cavity of the upper chamber, having a cover with an electrically conductive core and a ring of a nonconductive plastic that surrounds the core and is welded to the housing, and closed except at a gas outlet passage opening through the wall into the upper gas compartment;
a gas generator sealed inside the housing and electrically energizeable to generate gas and pressurize the gas compartment;
at least one spring contact on top of the housing, made of an electrically conductive plastic, formed on the core of the cover, and connected and extending through the housing to the gas generator;
a battery inaccessibly held on the housing of the gas generator and connected to the gas generator; and
an electronic controller removably mounted on the cartridge over the upper chamber and having electrical contacts connectable to the battery and to the spring contact on the housing of the gas generator only when the controller is mounted to the cartridge, the controller being powerable by the battery only when mounted to the cartridge for operating the gas generator and thereby pressurizing the gas compartment, moving the piston, and forcing the lubricant out of the outlet, the battery only being in operative electrical connection with the generator and with the controller when the controller is mounted on the upper chamber.

2. The lubricant dispenser defined in claim 1, further comprising:
a cover releasably securable to the cartridge over the electronic controller and
means on the cover for operation of the electronic controller through the cover.

3. The lubricant dispenser defined in claim 2, wherein the electronic controller is secured by the cover to the cartridge.

4. The lubricant dispenser defined in claim 1, wherein the spring contact extends upward and the contacts on the controller are concentric contact rings.

5. The lubricant dispenser defined in claim 1, wherein the gas generator includes at least one zinc/air cell that gives off hydrogen when electrically energized.

6. The lubricant dispenser defined in claim 1, wherein the housing of the gas generator is configured as a plastic injection-molded part that has a base made of an electrically nonconductive plastic and an electrically conductive part made of a conductive material, the electrically conductive part forming a contact surface for the battery and a contact element for the gas-generating cell electrically connected with the battery.

7. The lubricant dispenser defined in claim 1, wherein the housing of the gas generator has on its outside a clip for fixing the battery in place.

8. The lubricant dispenser defined in claim 1, wherein the gas outlet passage of the gas generator is connected with a related opening in the wall by a releasable connection.

9. The lubricant dispenser defined in claim 1, wherein the electronic controller has a board that is equipped with electronic components, a button for setting a dispensing time, and an LCD display, the back of the board being provided with concentrical circular conductor tracks forming the respective contacts.

10. The lubricant dispenser defined in claim 9, wherein the board is provided in a housing cover that has a window for the LCD display and an opening for activating the button, and can be attached to the lubricant cartridge by a screw or bayonet connection.

11. The lubricant dispenser defined in claim 10, wherein a seal is provided between the housing cover and the lubricant cartridge, and the window and the opening for the button are sealed off by a film.

12. The lubricant dispenser defined in claim 1, wherein the housing has two spring clips of which one directly engages the battery.

* * * * *